United States Patent Office 2,711,430
Patented June 21, 1955

2,711,430

METHOD OF IMPROVING THE YIELD OF METHYL SULFIDE OBTAINED BY HEATING WASTE LIQUORS FROM CELLULOSE MANUFACTURE BY ADDING INORGANIC SULFIDES

Erik Karl Mauritz Hägglund, Stockholm, and Terje Ulf Engen Enkvist, Lidingö, Sweden, assignors to Svenska Cellulosaforeningens Centrallaboratorium (Cellulosaindustriens Centrallaboratorium), Stockholm, Sweden, a Swedish firm No Drawing. Application April 27, 1951, Serial No. 223,444

Claims priority, application Sweden June 27, 1950

7 Claims. (Cl. 260—609)

It is known that when waste liquors from the cellulose manufacture are heated, small quantities of methyl sulfide may be formed. This substance has for a long time been considered an objectionable by-product, the amount of which it has been attempted to reduce as far as possible with various means. Now, however, the methyl sulfide may be considered a useful starting material for the preparation of valuable products, particularly methyl sulfoxide.

The present invention has for its object to provide a method of improving the yield of methyl sulfide obtained by heating waste liquors from the manufacture of cellulose, from an insignificant amount to quantities, which are sufficient to make possible the production of methyl sulfoxide and other valuable substances in considerable quantities. This is accomplished by heating the waste liquors in the presence of metal sulfides or other substances containing inorganic sulfidic or hydrosulfidic sulfur, which has proved to be particularly capable of splitting off the methoxyl of the lignin to form methyl sulfur compounds.

According to a preferred embodiment of the invention sodium sulfide or a substance containing sodium sulfide, for instance soda smelt from sulfate cellulose production, is added to evaporated black liquor from sulfate cellulose digestion. Instead of sulfate black liquor, however, black liquor derived from cellulose digestion with soda liquor free from sulfur may be used or even sulfite waste liquor, and the waste liquors may be concentrated or unconcentrated. The sodium sulfide may be replaced by sulfides of other metals, e. g. by calcium sulfide or by ammonium hydrosulfide. Also, instead of sulfides, alkalies and sulfur may be added in another form, e. g. as sodium hydroxide and sulfur or in the form of thiosulfates of various metals. Particularly when sulfite waste liquor is treated lime and sulfur may advantageously be added.

The process may be carried out at normal or superatmospheric pressure in accordance with previously known principles (see for instance the U. S. Patents Nos. 1,680,540, 1,772,216 and 1,795,557). Suitably the heating is carried to a temperature of between 150° and 500° C., preferably between 250° and 350° C.

Besides methyl sulfide a certain amount of methyl mercaptan is formed in the heat treatment. This substance may to a substantial extent be transformed into methyl sulfide by means of procedures which are known per se, for instance by passing the mercaptan over heated metal sulfide catalysts or by reaction with alkali salts of methyl sulfuric acid. After the production of the methyl sulfide the black liquor may be subjected to combustion as in the conventional sulfate process, if desired after being treated to yield other useful products such as acetone, butanone etc. in accordance with known methods.

A special advantage of the present method is that the amount of sodium sulfide required is comparatively little and may be added in the form of soda smelt of the kind that is produced in the usual sulfate cellulose process. Thus, no other chemicals are needed for the production of methyl sulfide than sodium sulfate that is always added to replace the loss of alkali and sulfur in technical sulfate cellulose production.

Example

To 1 kg. of concentrated sulfate black liquor having a solid content of 54% and an ash content of 23% there is added a quantity of sodium sulfide corresponding to 3.4 g. of anhydrous $Na_2S$, the mixture is heated, whereby the water is first evaporated. Thereafter the mixture is heated for 4 hours at 300 C., during which period the methyl sulfide is separated in the distillate by cooling (first fraction). The uncondensed gas, that contains among other substances methyl mercaptan is passed at 350° C. over a catalyst containing cadmium sulfide, whereby the larger part of the mercaptan is transformed into methyl sulfide (second fraction) that is condensed by cooling. The yield of methyl sulfide of first fraction is 5.9 g. and of second fraction 4.0 g. Together this corresponds to about 29 kg. per ton pulp.

Having now particularly described the nature of our invention and the manner of its operation what we claim is:

1. The method of producing methyl sulfide which comprises adding an inorganic sulfide to waste liquor from alkaline cellulose digestion, heating the mixture at a temperature between 150° C. and 500° C., and recovering the methyl sulfide formed thereby.

2. The method of producing methyl sulfide which comprises adding an inorganic sulfide to sulfate waste liquor, heating the mixture at a temperature between 150° C. and 500° C., and recovering the methyl sulfide formed thereby.

3. The method of producing methyl sulfide which comprises adding an inorganic sulfide to concentrated waste liquor, heating the mixture at a temperature between 150° C. and 500° C., and recovering the methyl sulfide formed thereby.

4. The method of producing methyl sulfide which comprises adding sodium sulfide to waste liquor from alkaline cellulose digestion, heating the mixture at a temperature between 150° C. and 500° C., and recovering the methyl sulfide formed thereby.

5. The method of producing methyl sulfide which comprises adding sodium sulfide to sulfate waste liquor, heating the mixture at a temperature between 150° C. and 500° C., and recovering the methyl sulfide formed thereby.

6. The method of producing methyl sulfide which comprises adding sodium sulfide to concentrated sulfate black liquor, heating the mixture at a temperature between 150° C. and 500° C., and recovering the methyl sulfide formed thereby.

7. The method of producing methyl sulfide which comprises adding sodium sulfide to sulfate black liquor, heating the mixture at a temperature between 250° C. and 350° C., and recovering the methyl sulfide formed thereby.

References Cited in the file of this patent

UNITED STATES PATENTS

| | | |
|---|---|---|
| 1,834,676 | Bradley | Dec. 1, 1931 |
| 1,910,441 | Lubs | May 23, 1933 |

OTHER REFERENCES

Griffen, Technical Methods of Analysis (2nd ed., 1927), pgs. 391–394.